(12) United States Patent
Ettala et al.

(10) Patent No.: US 6,644,890 B1
(45) Date of Patent: Nov. 11, 2003

(54) TREATMENT OF OXIDABLE GAS GENERATED FROM WASTE AT A DUMPING AREA

(75) Inventors: Matti Ettala, Helsinki (FI); Petri Väisänen, Espoo (FI)

(73) Assignee: Matti Ettala Oy, Helsinki (FI)

( * ) Notice: Subject to any disclaimer, the term of this patent is extended or adjusted under 35 U.S.C. 154(b) by 0 days.

(21) Appl. No.: 10/070,392

(22) Filed: Mar. 4, 2002

(30) Foreign Application Priority Data

Sep. 2, 1999 (FI) .............................................. 19991877

(51) Int. Cl.⁷ .............................. B09C 1/10; B09B 5/00
(52) U.S. Cl. ........................... 405/129.95; 405/128.15; 405/129.1; 405/129.85; 210/901; 588/251
(58) Field of Search .............................. 405/53, 128.15, 405/129.1, 129.35, 129.5, 129.57, 129.7, 129.85, 270, 129.95; 166/369, 370; 210/170, 901; 588/252, 259, 251

(56) References Cited

U.S. PATENT DOCUMENTS

| | | | |
|---|---|---|---|
| 4,442,901 A | * | 4/1984 | Zison .......................... 166/369 |
| 4,487,054 A | * | 12/1984 | Zison .......................... 73/19.04 |
| 5,206,067 A | * | 4/1993 | Bonzo .......................... 428/119 |
| 5,211,428 A | * | 5/1993 | Emerson et al. .......... 285/141.1 |
| 5,562,586 A | * | 10/1996 | Hyde-Smith ................ 588/250 |
| 5,857,807 A | | 1/1999 | Longo, Sr. ............... 405/129.7 |
| 5,888,022 A | * | 3/1999 | Green ...................... 405/128.6 |
| 5,984,580 A | * | 11/1999 | Ham et al. ................ 405/129.2 |
| 6,024,513 A | * | 2/2000 | Hudgins et al. ........ 405/129.95 |
| 6,481,929 B1 | * | 11/2002 | Layton et al. .......... 405/129.95 |

FOREIGN PATENT DOCUMENTS

DE 33 00 464 A1 7/1984
JP A 2-187184 7/1990

OTHER PUBLICATIONS

Chemical Abstracts No. 121604, V. 126, 1997, Witold Stepniewski et al., "A Possibility to Reduce Methane Emission from Landfills by its Oxidation in the Soil Cover."

G. Münk et al., "Entwässerung und Entgasung von Mülldeponien," Kunststoffe, V. 79, 1989, pp. 454–457.

Chemical Abstracts 112862. V/ 120. 1999, M. Humer et al., "Disposing of Landfill Gas from Disused Dumps with the Help of Microorganisms."

Christian Maurice, Landfill Gas Emission and Landfill Vegetation, Licentiate Thesis, 1998, Luleå University of Technology, Copenhagen.

David Kightley et al., "Optimising Methane Oxidation in Landfill Cover Soils," 1994, Essex, R&D CWM 114/94L, Contract PECD 7/10/267.

* cited by examiner

Primary Examiner—Thomas B. Will
Assistant Examiner—Tara L. Mayo
(74) Attorney, Agent, or Firm—Young & Thompson

(57) ABSTRACT

A method for treating oxidable gas generated from waste at a dumping area and to the structure of the dumping area. The dumping area has an organic waste layer covered with a sealing layer that prevents the absorption of water, with a drying layer and a surface layer. Oxidable gas is generated and directed through an aperture formed in the sealing layer and made to spread in, the lateral direction with the help of one or several flow controllers so that the gas ends in the surface layer to become biologically oxidized. The aperture may be provided with a cover, and the gas flow controllers may be perforated pipes extending radially from a side of a well. The oxidation of gas may be intensified by directing air and/or moisture from a piping to the surface layer.

17 Claims, 1 Drawing Sheet

TREATMENT OF OXIDABLE GAS GENERATED FROM WASTE AT A DUMPING AREA

BACKGROUND OF THE INVENTION

The present invention relates to the treatment of oxidable gas generated from waste at a dumping area, in which the waste layer generating gas is covered with a sealing layer preventing the absorption of water and with at least one overlying material layer. Further, the invention relates to a dumping area structure, in which the said method is applicable.

In dumping areas for industrial and municipal waste, methane-containing gas is generated from organic waste in oxygen-free conditions. Gas flowing uncontrollably into the environment causes inconveniences in form of smell, problems in the landscaping of the dumping area, and in the worst case, explosion risks and fires as it accumulates to the structures. On a global level, methane releases into the atmosphere are problematic.

The bulk of biogas generated at dumping areas may be recovered to be utilised in the production of energy or as fuel for vehicles. The recovery requires a suction system, collection pipings, and a pumping plant for biogas. If the recovered gas is not utilised, it may be destroyed by torch burning. At small dumping areas, where gas does not cause immediate security risk or hazard to health, and where the generated amounts of gas are too small for the recovery to be economically profitable, the said active recovery systems will, however, become unreasonably expensive.

It is known that biological oxidation of gas occurs in the surface layer at a dumping area in favourable conditions, due to the effect of micro-organisms so that methane and oxygen react to form carbon dioxide and water; cf. for example Kightley D: Nedwell D. "Optimising methane oxidation in landfill cover soils". The Technical Aspents of controlled Waste Management, Department of the Environment, Report No CWM 114/94, Juli 1994, Humer M: Lechner Peter. "Grundlage der biologischen Methanoxidation". WASTE REPORTS 05, Universität für Bodenkultur Wien, and Maurice 1998, Landfill Gas Emission and Landfill Vegetation. Licenciate hesis. Lulea University of Technology. Department of Environment Engineering. Division of Landfill Science & Technology. 1998:01. In a similar way, gas may be oxidised in separate biofilters. Besides methane, micro-organisms may oxidise also stinking sulphur compounds.

According to a Finnish order of the authorities, which mainly follows the EU directive, after the filling area at the dumping area has reached its final height, a gas recovery layer, a sealing layer, a drying layer, and a surface layer have to be built on it in said order listed from down upwards. The purpose of the sealing layer is to prevent rainwater from becoming absorbed into the waste and from drifting to pollute water systems and groundwater. The purpose of the drying layer, which may comprise gravel or other similar coarse material permeable to water, is to collect the rainwater and direct it outside the dumping area. The sealing layer prevents the gas generated in the waste from erupting evenly through the surface layers of the dumping area so that also the biological oxidation of gas in the surface layer is prevented. If gas removal has not been arranged, gas may flow into the soil surrounding the dumping area, or it may break the sealing layer, which is why the demand for the controlled discharge of gases into the atmosphere is typically made on the filled-up dumping areas, if gas is not recovered for utilisation or burning. However, as methane is a strong greenhouse gas, it is hazardous to discharge it into the atmosphere.

SUMMARY OF THE INVENTION

The object of the invention is to provide a solution, with which methane and other oxidable gases generated at a dumping area may be treated to become harmless for the environment in cases in which the waste layer is covered with a sealing layer preventing the absorption of water and the discharge and/or diffusion of gas, and in which it would not be practical to build a separate gas recovery system for the utilisation of gas or for the destruction of it by burning. It is characteristic of the system according to the invention that gas is led in a self-operated manner through a penetration aperture formed to the sealing layer and that it is made to spread in the lateral direction to an upper material layer for the biological oxidation of gas by using one or more flow controllers arranged on and/or to the sides of the penetration aperture.

In other words, the object of the invention is to lead the gas, which naturally tends to rise upwards, in a controlled manner through the sealing layer and to spread it to the surface layer, in which micro-organisms oxidise the gas in a way known in it-self. With this solution, it is possible to reduce greenhouse gas releases, which are the result if gas is recovered in a known way to pipes or well structures from below the sealing layer and led directly into the atmosphere.

Thus, the invention is used for restricting greenhouse gas releases compared with the alternative that eases were recovered and led directly into the air; on the other hand. it is possible to achieve a considerable saving in costs compared with the alternative that gas were recovered from below the sealing layer to be destroyed by burning. Above all. these advantages concern small dumping areas or dumping areas generating only slight amounts of gas, with which the utilisation of gas to energy is unprofitable. The invention is an advantageous solution also in cases in which the methane content of gas is too low to be burned without supporting fuel. Because the invention is based on the self-operated transfer of gas from the waste to the oxidising surface layer, the advantage in investment and operating costs is considerable also in comparison with a conventional biological filter operated by means of pumping. Further, the invention may utilise the large oxidising capacity of the surface layer at the dumping areas, when again the capacity of a biofilter is restricted by its small-sized reaction vessel or other similar reaction space.

When required drying and surface layers are built on top of the sealing layer at a dumping area, the drying layer may preferably be utilised in spreading the gas to the surface layer, in which the oxidation occurs. The material of the drying layer, such as gravel, may in itself easily conduct gas, and it is possible to embed distribution pipes into the layer for intensifying the spreading of gas.

One solution for spreading the gas is to embed a plate-like piece into the upper layers above the penetration aperture made to the sealing layer at the dumping area. Such a plate may be placed horizontally, for example, between the drying layer and the oxidising surface layer. Alternatively, perforated pipes may be installed to extend radially to different directions from the penetration aperture to spread the gas in the lateral direction. The penetration aperture may comprise a sleeve-like piece penetrating the sealing layer, which may have a hollow interior, or which may be filled with material permeable to gas. A preferable solution is a well penetrating the sealing layer in the vertical direction, which is covered and from which perforated pipes spreading the gas extend radially to different directions. In these structures it has to be seen to that the edge of the well or sleeve extends above the sealing layer so that water is prevented from flowing to the waste layer under the sealing layer.

The invention may advantageously be applied by leading air and/or moisture into the oxidising surface layer at the dumping area, with which the bacterial action and the oxidation of gas are intensified.

BRIEF DESCRIPTION OF THE DRAWINGS

The invention is next described in more detail with the help of examples and referring to the enclosed drawings, in which.

DETAILED DESCRIPTION OF THE PREFERRED EMBODIMENTS

Figure 1:
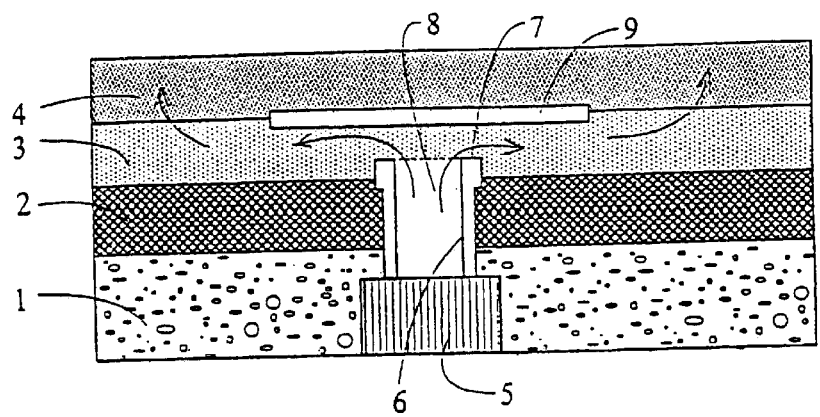
FIG. 1 is a vertical section of the upper layers of the dumping area. in which the sealing layer is provided with a sleeve-like penetration aperture for gas, with a horizontal control plate being inserted above the aperture for controlling the gas flow.

In FIG. 1, there is shown the surface structure of a dumping area, which has been filled up and covered after filling, the structure comprising mainly a sealing layer 2 permeable to water, a drying layer 3 conveying water, and a surface layer 4 above the waste layer 1 in said order. The waste layer 1 typically consists of organic industrial or municipal waste, and the thickness of the layer may be several tens of meters. The purpose of the sealing layer 2 is to prevent the absorption of rainwater into the waste layer 1 and thus make it possible to control the moisture in the waste layer, for example, with the help of separate controlled wetting. The material for the sealing layer 2 may vary; the layer may be formed of a plastic film, or it may be formed of a compact insulation consisting of some waste material. Usable materials are, for example, ash, clay, minerals, bentonite, green liquor deposit, and combinations of these. Besides water, the sealing layer also prevents gas from travelling through the layer. The materials for the drying layer 3, the purpose of which is to collect rainwater which has penetrated the surface layer 4 and to lead it to the sides of the dumping area, may comprise coarse materials easily permeable to water, such as gravel, rubber granules, or crushed construction waste, or carpets or other woven materials. The uppermost surface layer 4 typically comprises soil or organic material in form of particles, such as bark chips, wood chips, fibre waste from the forest industry, compost, or some other plant-based substance. The thickness of the drying and surface layer 3, 4 may typically be from a half meter to some meters.

In oxygen-free conditions, methane and possibly sulphurous oxidable gases are generated in the waste layer 1, and they are led to the surface layer 4 in accordance with the invention, in which they become oxidised due to the effect of micro organisms. In FIG. 1, the reference number 5 refers to the schematically shown gas recovers system, which may comprise pipes extending to the lower parts of the waste laser 1 in the vertical direction, and branches that are laterally joined with the said pipes. These systems are as such known to those skilled in the art. A suitably annular sleeve 6, made for example, of plastic, concrete, or steel, and penetrating the sealing layer 2 has been arranged as an extension for the upper end of the as recovery piping 5. The upper edge 7 of the sleeve rises slightly above the sealing layer 2, the purpose of this being to prevent rainwater from flowing into the sleeve 6. The sleeve 6, the interior 8 of which is hollow in FIG. 1 and which is covered with a crating, allows the gas recovered from the waste layer 1 to flow through it to the lower drying layer 3. Above the sleeve 6, on the boundary of the drying layer 3 and the surface layer 4, there is a horizontal control plate 9, the purpose of which is to turn the gas flow penetrating the sleeve 6 to the lateral direction so that the flow spreads to the drying layer 3 easily permeable to gas, and from there further to the more compact surface layer 4, which operates as culture medium for the bacteria oxidising the gas. The control plate 9 is most suitably made of plastic and of a circular or rectangular shape, the diameter of which is larger than that of the sleeve 6. The diameter may vary to a large extent, being at most about 20 m. Also a plastic film may be concerned, which may contain small apertures for making the spreading of gas more even.

Figure 2:
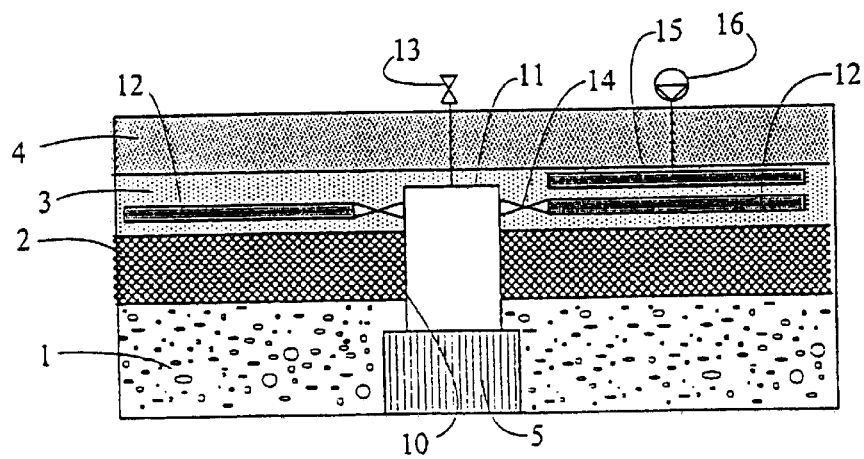
FIG. 2 is a sectional view similar to FIG. 1 of the second embodiment of the invention, in which a covered well penetrates the sealing layer, radial pipes extending from said well to spread the gas flow, and in which air and/or moisture is further directed to the surface layer of the dumping area.

The embodiment in FIG. 2 differs from the one shown in FIG. 1 in that the penetration aperture for gas recovered from the waste layer 1 comprises cylindrical, hollow well 10, which is provided with a tight cover 11 and with radially perforated pipes 12 extending from the side, spreading the gas flow to the drying layer 3. From the drying layer, the gas is further transferred to the oxidising surface layer 4. The well 10 and pipes 12 may, for example, be made of plastic, concrete, or steel.

According to FIG. 2, the well 10 is provided with a pressure gauge 13 and the pipes 12 are provided with valves 14, making it possible to follow and control the gas flow in different pipes. For example, if it is found that a disproportionately large part of the gas flow is directed to a certain pipe, thus disturbing the even distribution of gas, the pipe in question may be choked with the valve, or it may be totally closed, when required.

Figure 3:
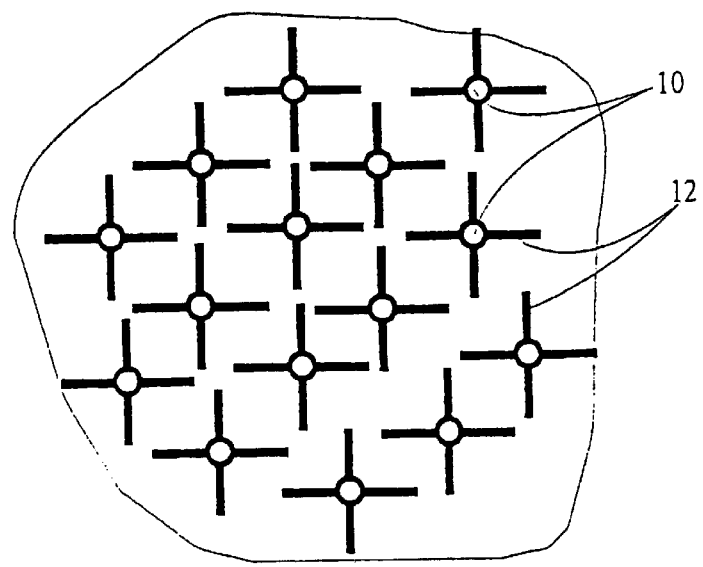
FIG. 3 is a schematic top view of a dumping area provided with wells and spreading pipes for gas according to FIG. 2.

The wells 10 and the pipes 12 radially extending from these may be arranged at a dumping area at suitable intervals, for example, according to FIG. 3. If the length of each pipe 12 is about 5 m, and the distance between the wells 10 is about 10 m, respectively, it is possible to utilise the surface layer 4 of the dumping area in an efficient way for the oxidation of gas. Depending on the circumstances, the wells 10 may be placed at larger intervals so that, respectively, the pipes 12 are possibly longer, or they may be branched, or they may be made curving for intensifying the spreading of gas.

When necessary, the oxidation of gas occurring in the surface layer 4 may be intensified by leading air or moisture to the layer. In FIG. 2, there is shown a separate perforated distributor pipe 15 embedded in the drying layer 3 under the surface layer, in which the supply flow may occur in a self-operated manner with the help of pumping or a blower 16. Alternatively, a distribution piping existing at the dumping area may be utilised for leading air and moisture.

It is obvious for one skilled in the art that the different embodiments of the invention are not. limited to the examples described above, but that they may vary within the scope of the enclosed patent claims. For example, the sealing layer 2 may be inclined away from the aperture around the penetration aperture, etc. of the well 10 for ensuring that water cannot flow to the waste layer 1 through the aperture or its outer surfaces. Further, the sleeve 6 forming the penetration aperture according to FIG. 1 may be left without the cover crating so that it is filled with the material of the drying layer 3, such as gravel. The coarse materials in the drying layer do not form an obstacle for the increment flow.

What is claimed is:

1. A method for the treatment of oxidable gas generated from waste at a dumping area, in which a waste layer generating gas is covered with a sealing layer preventing the absorption of water and with at least one overlaying material layer, wherein the oxidable gas is led in a self-operated manner through a penetration aperture formed in the sealing layer, and wherein the oxidable gas is made to spread in a lateral direction to the at least one overlaying material layer, in which a biological oxidation of, gas occurs, using a flow controller arranged on at least one of a top and to sides of the penetration aperture.

2. The method according to claim 1, wherein the flow of gas is spread with the help of a plate structure impermeable to gas embedded in the layer above the sealing layer above the penetration aperture.

3. The method according to claim 1, wherein gas is led to at least one perforated pipe from the penetration aperture, spreading gas to the layer over the sealing layer.

4. The method according to claim 1, wherein the layers above the sealing layer comprise a drying layer and a surface layer on top of the drying layer, in which gas becomes biologically oxidized.

5. The method according to claim 1, wherein at least one of air and moisture is directed to a surface layer for intensifying the oxidation of gas.

6. The method according to claim 1, wherein the waste is industrial or municipal waste, the gas generated from which contains methane.

7. The method as claimed in claim 1 wherein the flow of gas is spread using a plastic film impermeable to gas embedded in the layer above the sealing layer above the penetration aperture.

8. A dumping area structure comprising:

a waste layer generating gas;

a sealing layer preventing the absorption of water covering said waste layer; and at least one overlaying material layer overlaying said sealing layer, wherein the sealing layer is provided with at least one aperture through which the gas penetrates; and wherein at least one gas flow controller is arranged on at least one of a top and to sides of the aperture for spreading the gas in a lateral direction to the at least one overlaying material layer, in which a biological oxidation of the gas occurs.

9. The structure according to claim 8, wherein the layers above the sealing layer comprise a drying layer and an overlying surface layer, in which the gas becomes biologically oxidized.

10. The structure according to claim 8, further comprising a plate structure impermeable to gas embedded above the penetration aperture into the layer above the sealing layer for turning the gas flow.

11. The structure according to claim 8, further comprising at least one perforated pipe, which spreads the gas coming from the penetration aperture to the layer above the sea ling layer.

12. The structure according to claim 11, wherein the pipe has a valve for controlling the gas flow.

13. The structure according to claim 8, wherein the at least one aperture consists of a well, the edge of which extends above the sealing layer so that water is prevented from flowing to the lower waste layer through the well.

14. The structure according to claim 13, wherein the well is covered, and wherein perforated pipes spreading the gas extend to sides of the well.

15. The structure according to claim 8, further comprising a separate piping for directing at least one of air and moisture to the surface layer at the dumping area.

16. The structure according to claim 8, further comprising a plastic film impermeable to gas embedded above the penetration aperture into the layer above the sealing layer for spreading the gas flow in the lateral direction.

17. A method for treating oxidable gas generated from waste at a dumping area, comprising the steps of:

generating gas in a waste layer;

covering the waste layer with a sealing layer to prevent absorption of water into said waste layer;

covering said sealing layer with a drainage layer;

covering the drainage layer with a layer for biologically oxiding the gas; and diffusing the gas through an aperture in said sealing layer and then laterally through said drainage layer into said layer for biologically oxiding the gas.

* * * * *

UNITED STATES PATENT AND TRADEMARK OFFICE
CERTIFICATE OF CORRECTION

PATENT NO.    : 6,644,890 B1
DATED         : November 11, 2003
INVENTOR(S)   : Matti Ettala et al.

It is certified that error appears in the above-identified patent and that said Letters Patent is hereby corrected as shown below:

Title page,
Item [22], PCT filing date, to read as follows:
-- [22], PCT Filed: Sept. 1, 2000 --
Item [86], PCT No.: -- [86]    PCT/FI00/00738
§371 (c) (1) ,
 (2) , (4) Date: March 4, 2002 --.
Item [87],
-- [87] PCT Pub. No.: WO01/17701
         PCT Pub. Date: March 15, 2001 --.

Signed and Sealed this

First Day of June, 2004

JON W. DUDAS
*Acting Director of the United States Patent and Trademark Office*